(12) United States Patent
Bossoni et al.

(10) Patent No.: US 10,507,555 B2
(45) Date of Patent: Dec. 17, 2019

(54) BEAM PROCESSING MACHINES

(71) Applicant: Bystronic Laser AG, Niederoenz (CH)

(72) Inventors: Sergio Bossoni, Zurich (CH); Markus Steinlin, Zurich (CH)

(73) Assignee: BYSTRONIC LASER AG (CH)

( * ) Notice: Subject to any disclaimer, the term of this patent is extended or adjusted under 35 U.S.C. 154(b) by 706 days.

(21) Appl. No.: 14/678,140

(22) Filed: Apr. 3, 2015

(65) Prior Publication Data

US 2015/0283662 A1 Oct. 8, 2015

(30) Foreign Application Priority Data

Apr. 3, 2014 (EP) .................................... 14163458

(51) Int. Cl.
*B23Q 11/00* (2006.01)
*B23K 26/08* (2014.01)
*B23K 37/04* (2006.01)
*B23Q 1/01* (2006.01)
*B24C 1/04* (2006.01)

(52) U.S. Cl.
CPC ...... *B23Q 11/0032* (2013.01); *B23K 26/0876* (2013.01); *B23K 37/04* (2013.01); *B23K 37/0461* (2013.01); *B23Q 1/015* (2013.01); *B24C 1/045* (2013.01)

(58) Field of Classification Search
CPC .... B23K 26/38; B23K 26/70; B23K 26/0876; B23K 37/04; B23K 37/0461; B23Q 1/015; B23Q 11/0032; B23Q 1/38; B23Q 1/385; B23Q 1/03; B23Q 1/25; B24C 1/045; B25B 11/02
USPC ........................................ 219/121.79; 451/75
See application file for complete search history.

(56) References Cited

U.S. PATENT DOCUMENTS

| 4,958,437 | A | * | 9/1990 | Helms | ................... | G01B 5/008 |
| | | | | | | 33/1 M |
| 5,941,654 | A | * | 8/1999 | Chauquet | ................ | H01R 4/30 |
| | | | | | | 174/88 B |
| 6,679,470 | B2 | | 1/2004 | Metelski | | |
| 6,727,457 | B1 | * | 4/2004 | Vande Berg | ............ | B08B 15/00 |
| | | | | | | 219/121.39 |

(Continued)

FOREIGN PATENT DOCUMENTS

| DE | 10335043 B3 | 5/2005 |
| DE | 202005014428 U1 | 1/2006 |

(Continued)

OTHER PUBLICATIONS

EPO search report and written opinion from priority EPO application EP14163458, dated Oct. 9, 2014 (in German).

*Primary Examiner* — Ibrahime A Abraham
*Assistant Examiner* — Chris Q Liu
(74) *Attorney, Agent, or Firm* — Workman Nydegger; Carl T. Reed

(57) ABSTRACT

Beam processing machines such as laser beam or fluid jet processing machines (1) for processing workpieces (5) include a frame (3), a workpiece rest (4) held by the frame (3), and a beam tool (2) movable relative to the workpiece rest (4). Incorporated in a vibration-transmitting connecting path between the beam tool and the rest surface for workpieces defined by the workpiece rest are a plurality of damping elements that decouple vibrations between the rest surface and beam tool, its mounting, or the frame.

36 Claims, 14 Drawing Sheets

(56) References Cited

U.S. PATENT DOCUMENTS

| | | | |
|---|---|---|---|
| 2003/0034624 A1* | 2/2003 | Schmidt | B60G 7/006 |
| | | | 280/124.108 |
| 2004/0008331 A1* | 1/2004 | Cox | B23Q 1/58 |
| | | | 355/53 |
| 2005/0084355 A1 | 4/2005 | Zoran | |
| 2006/0250685 A1 | 11/2006 | Metelski | |
| 2008/0058109 A1 | 3/2008 | Metelski | |
| 2008/0156777 A1 | 7/2008 | Gattiglio et al. | |
| 2008/0257667 A1 | 10/2008 | Hamann et al. | |
| 2009/0233536 A1* | 9/2009 | Crees | B08B 15/00 |
| | | | 454/49 |
| 2011/0147563 A1 | 6/2011 | Metelski | |
| 2011/0272874 A1* | 11/2011 | Frank | H01L 21/68728 |
| | | | 269/254 CS |
| 2012/0217229 A1 | 8/2012 | Kilian | |

FOREIGN PATENT DOCUMENTS

| | | | | |
|---|---|---|---|---|
| DE | 102012102820 A1 | 10/2013 | | |
| EP | 2465637 A1 | 6/2012 | | |
| EP | 2626165 A1 | 8/2013 | | |
| EP | 2700838 A1 * | 2/2014 | | E01B 3/46 |
| FR | 2761628 A1 * | 10/1998 | | B23Q 11/0032 |
| WO | 2005/035185 A1 | 4/2005 | | |
| WO | 2006/035307 A1 | 4/2006 | | |

\* cited by examiner

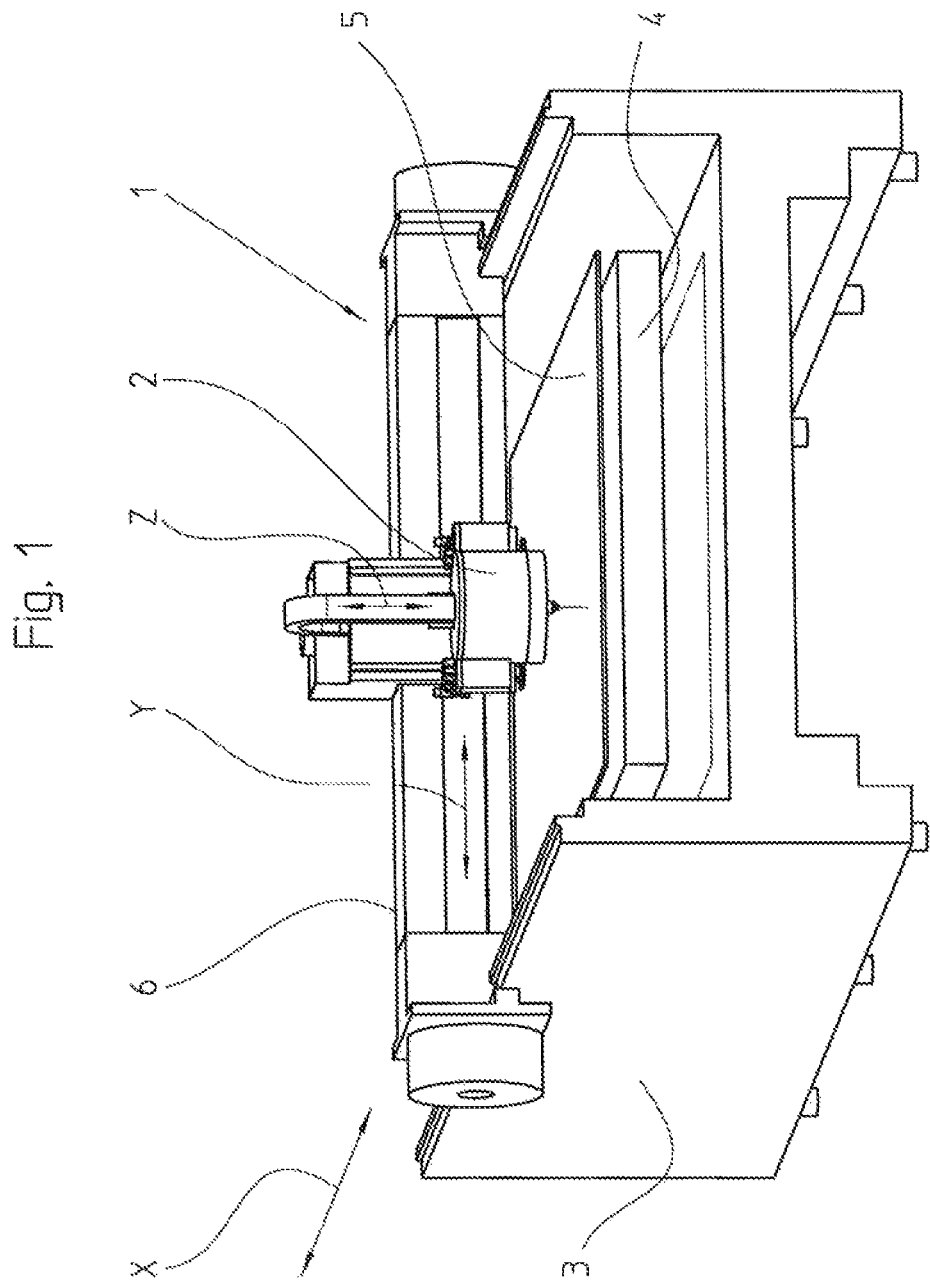

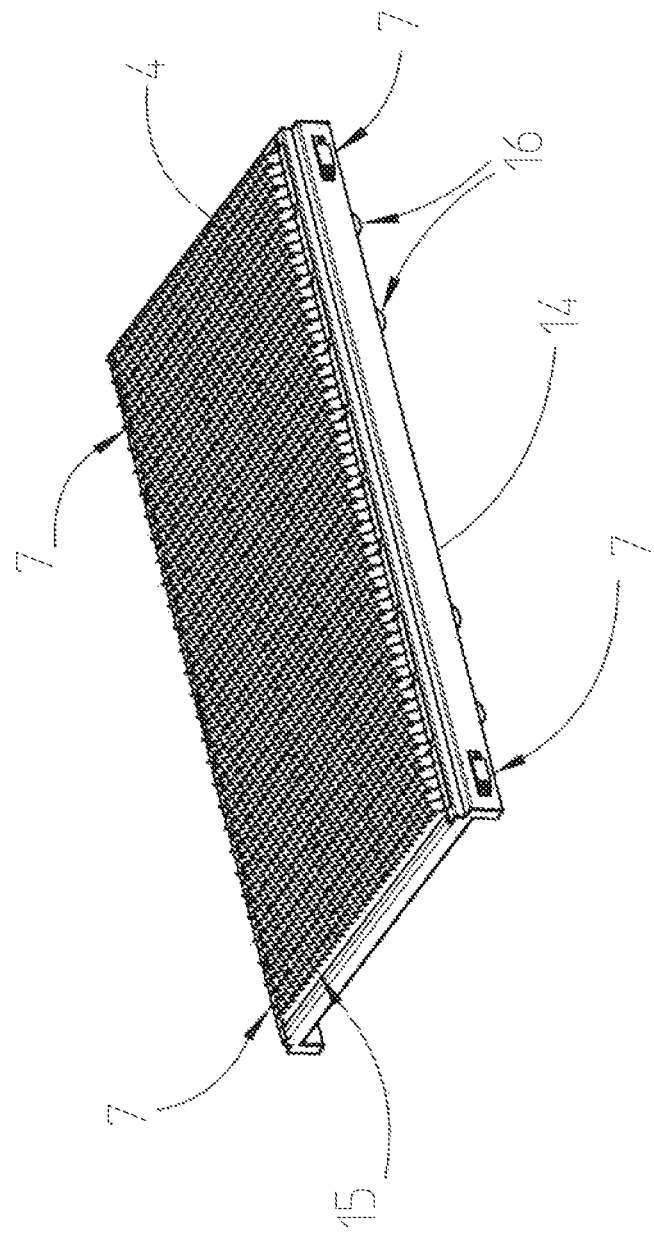

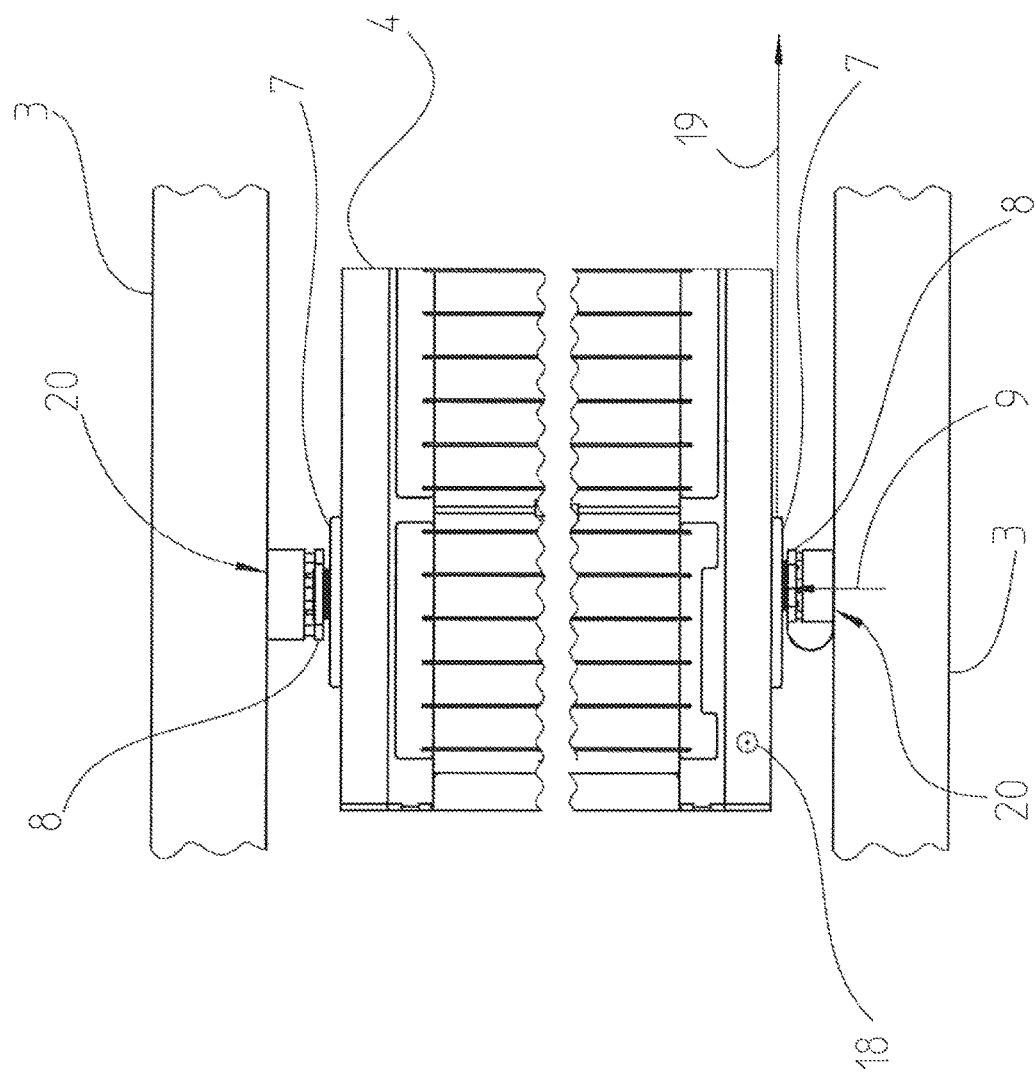

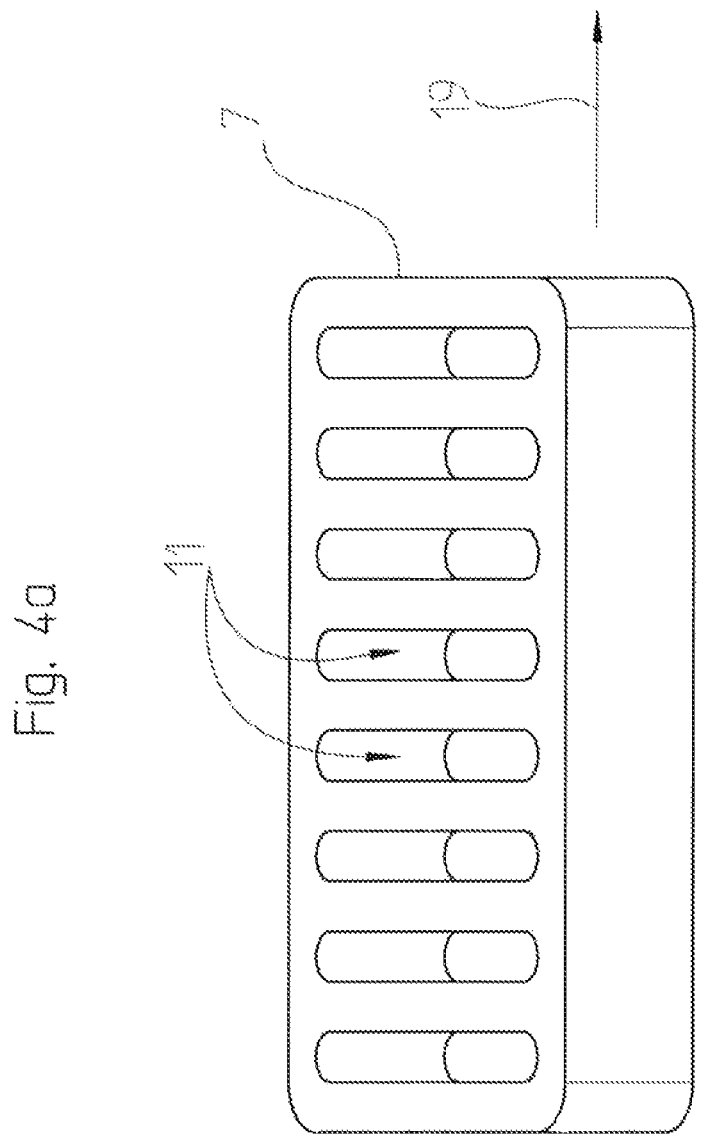

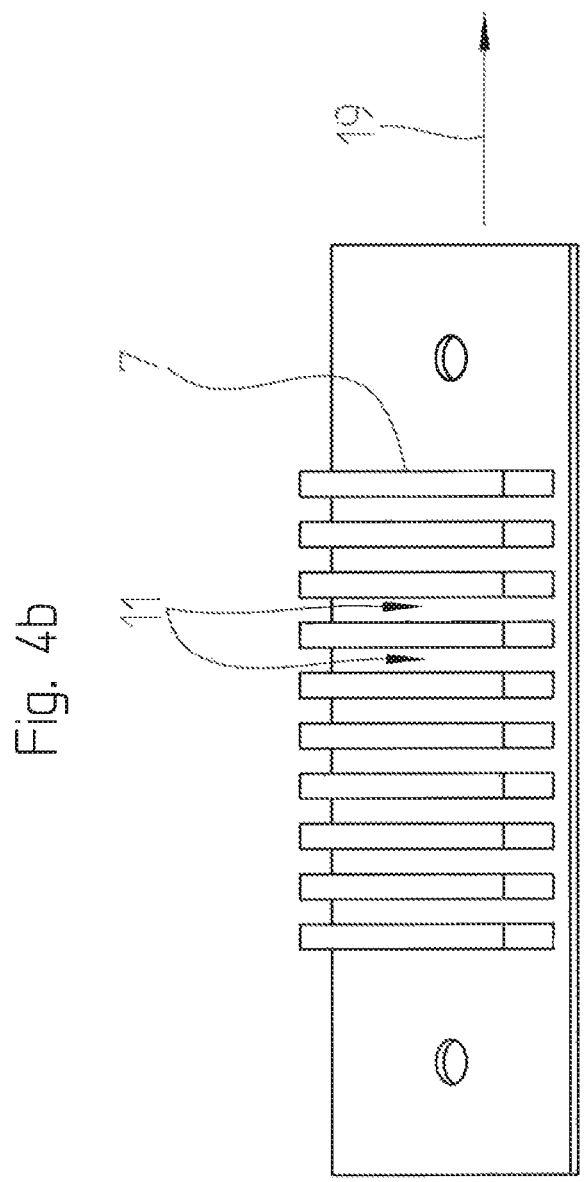

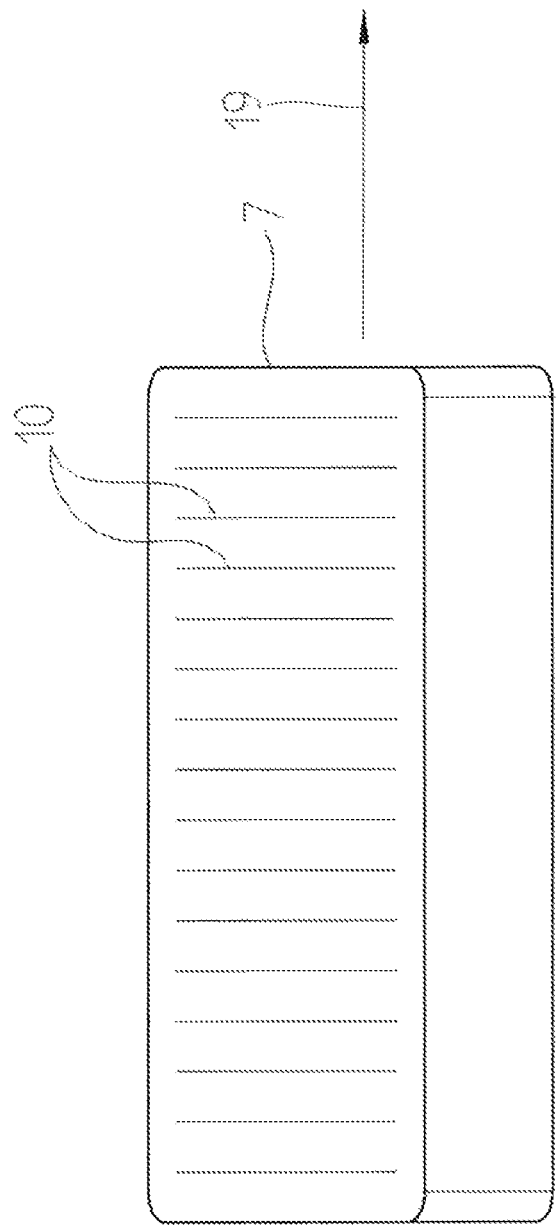

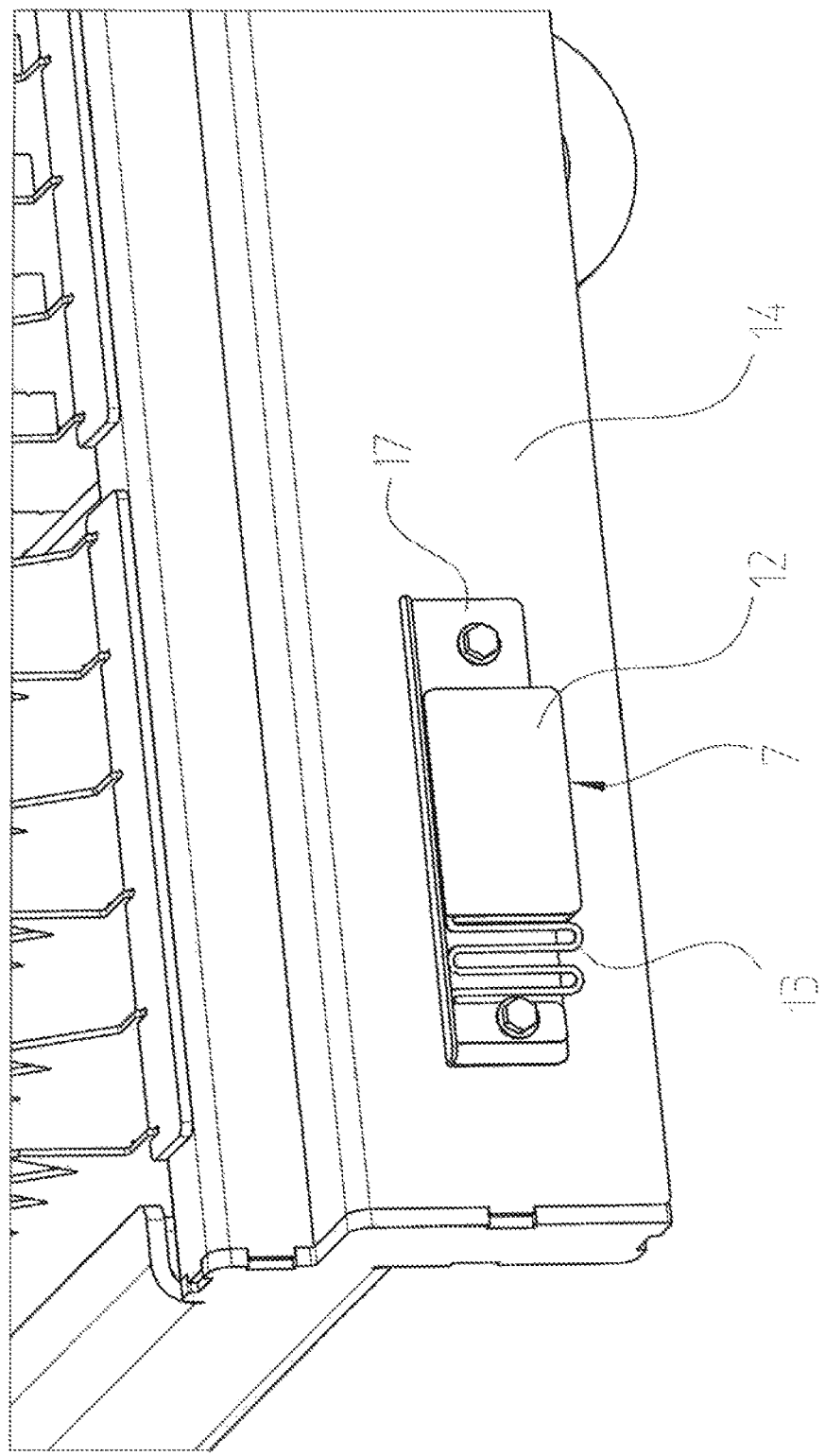

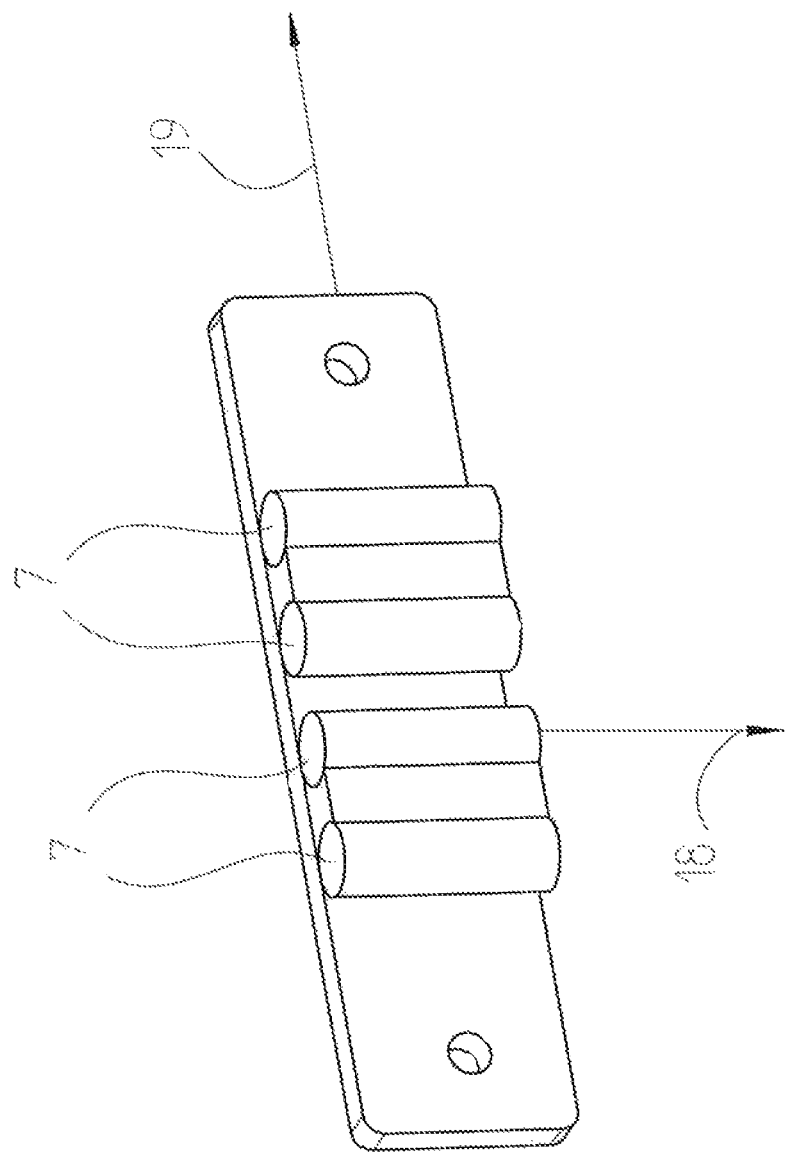

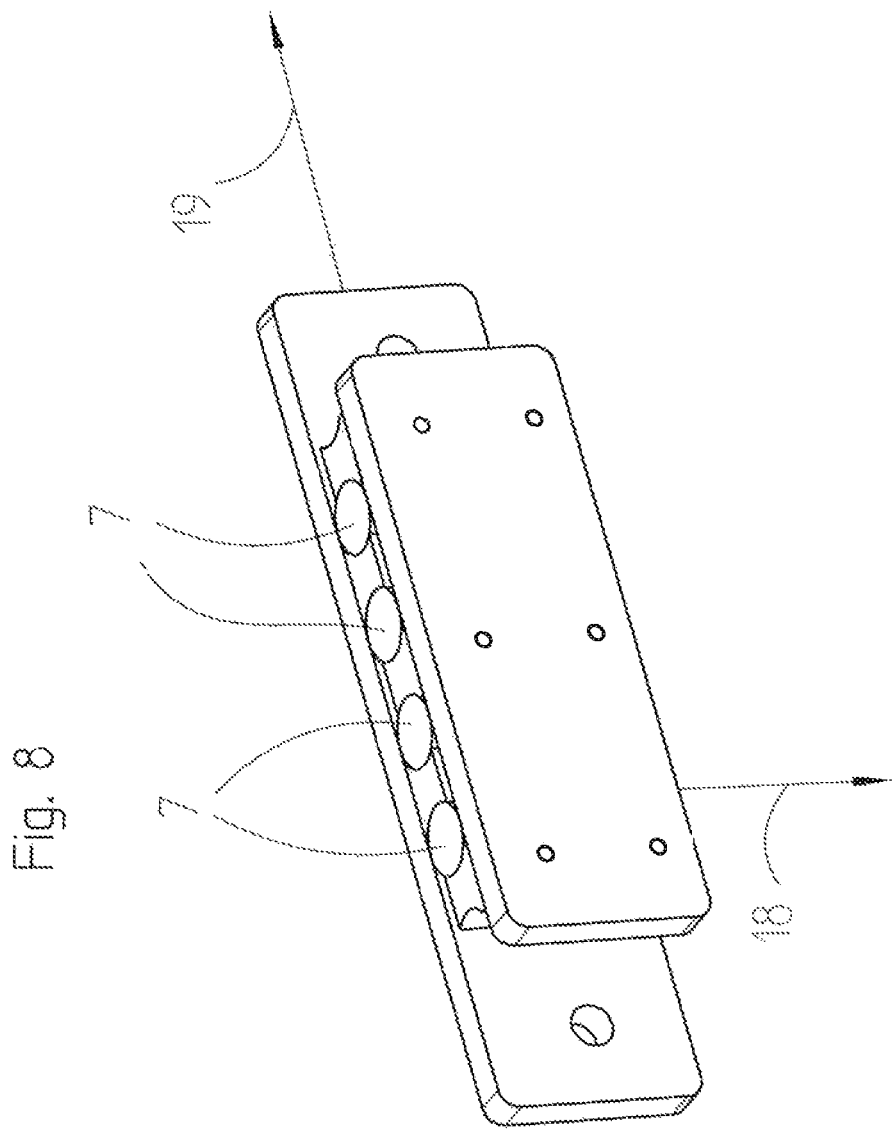

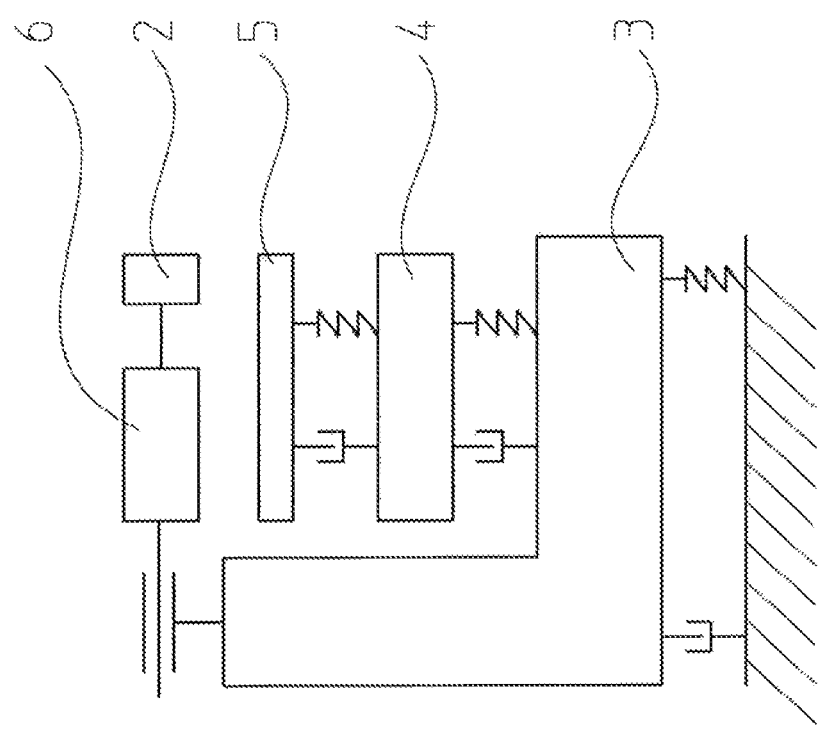

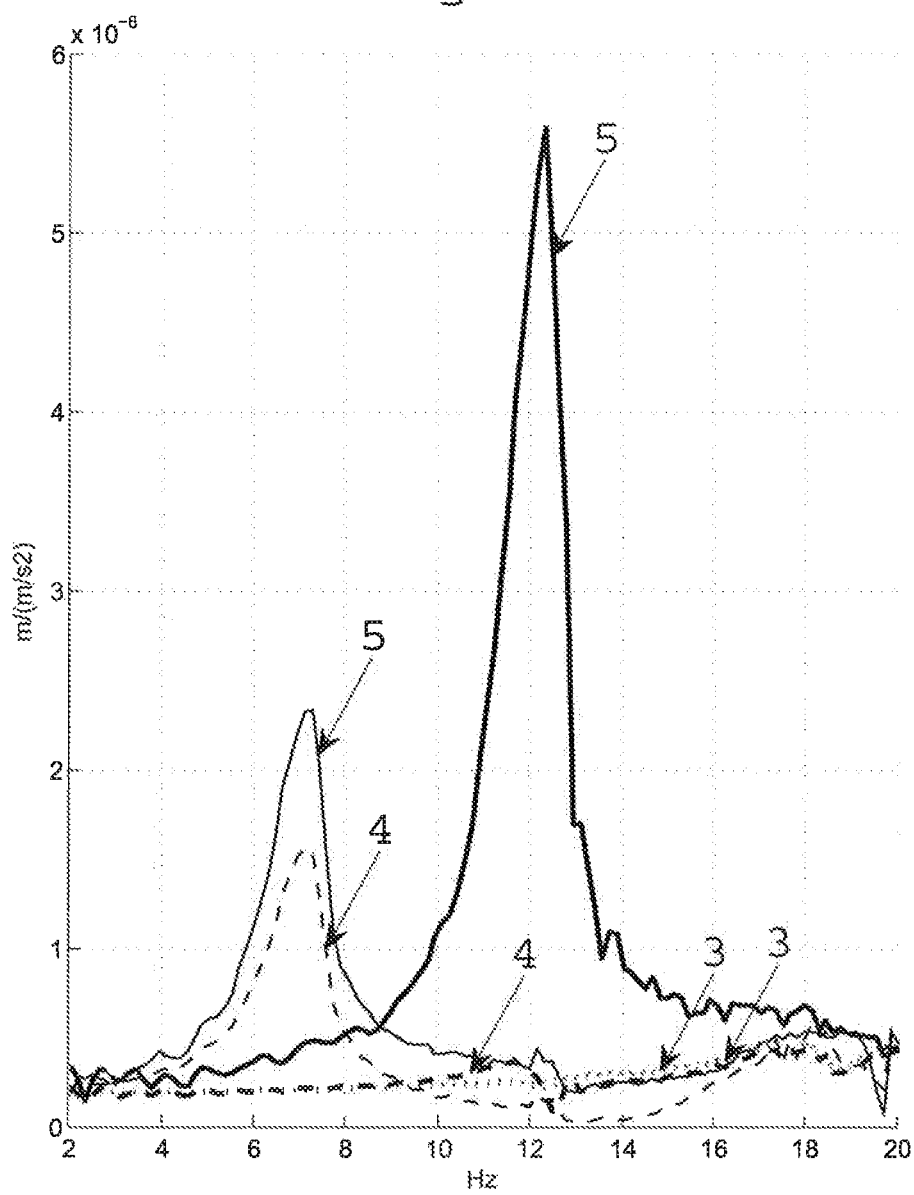

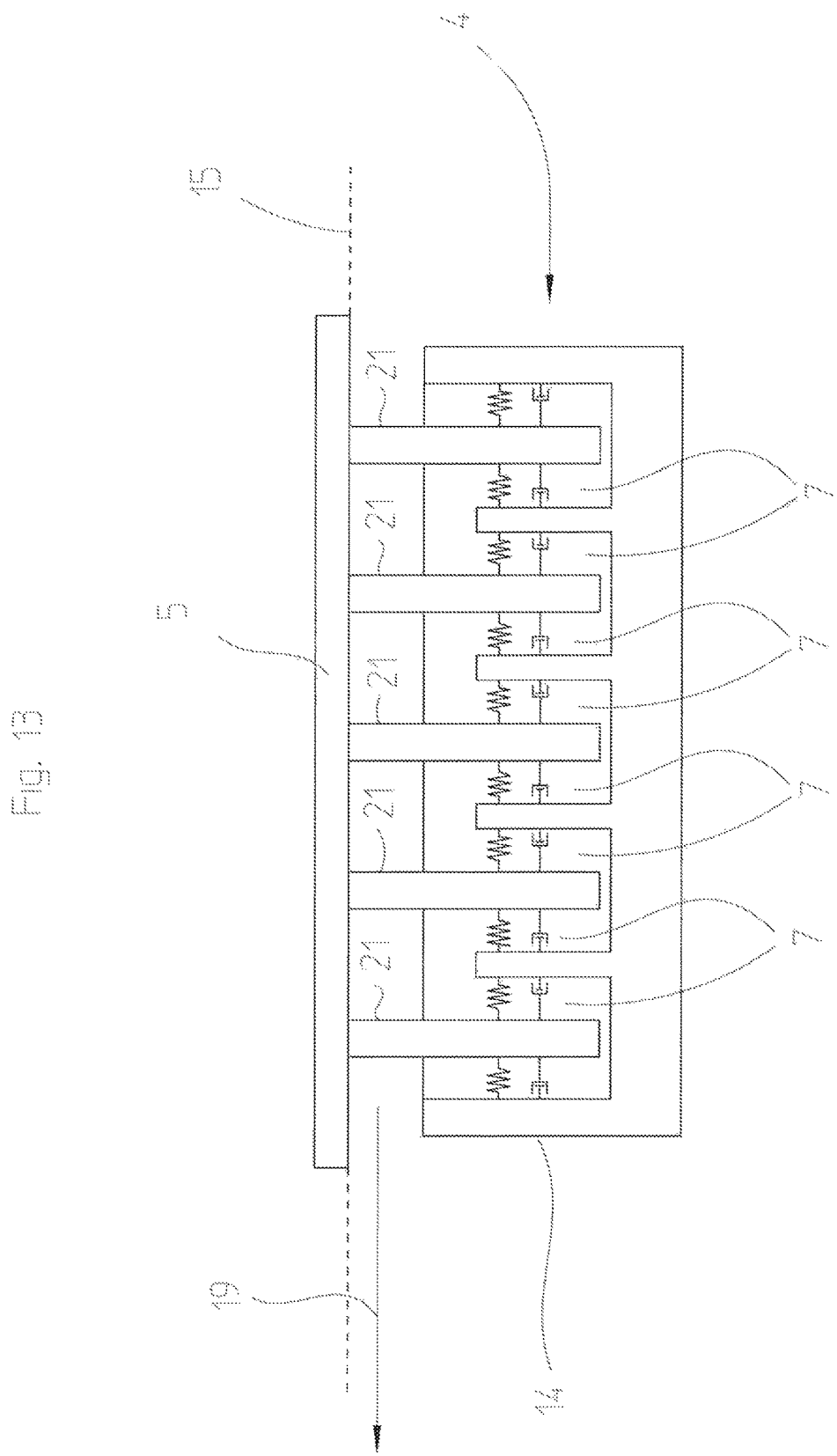

BEAM PROCESSING MACHINES

This application claims benefit of priority to prior European (EPO) application no. EP14163458 filed on Apr. 3, 2014, and the entirety of this European application no. EP14163458 is expressly incorporated herein by reference in its entirety and as to all its parts, for all intents and purposes, as if identically set forth in full herein.

BACKGROUND

The present disclosure relates to beam processing machines for processing workpieces. In particular, these may be laser beam or fluid jet processing machines, including frames, workpiece rests held by the frames, and a beam tool that is carried by the frame and that is movable relative to workpiece rest.

In laser machines the workpiece is usually not held firmly as in many other machine tools, but rather lies loosely on the workpiece rest, such as for example a cutting grid. The highly dynamic movement of fairly large masses (such as for example, a cutting bridge with ~500 kg mass) results in excitation of the machine frame that in turn excites the sheet metal on the cutting grid via the cutting table. The undesired movement of the sheet metal results in a reduction of contour accuracy and in the phenomenon of wave cut. In order to at least partially reduce these negative effects on the cutting quality, the machine dynamics and therefore the productivity must be limited. The resulting increased processing times constitute appreciable disadvantages of such processing machines.

In order to reduce the workpiece excitation, the workpiece may be fixed or clamped on the workpiece rest. For example, prior DE-102012102820A1 discloses a clamping device for clamping sheet metal components. The sheet metal components are thereby fixed during processing. Another prior reference EP-2465637A1 discloses, for fixing a plate-like workpiece on a workpiece moving unit of a machine tool, a workpiece holding device comprising at least two workpiece clamping elements.

Such solutions certainly allow higher tool dynamics, but may be understood to have at least the following decisive disadvantages:
- they require additional machine components: for example, a workpiece clamping by actuators or adjustable clamping elements to be provided specifically for this purpose on the table;
- they manifest complicated workpiece automation;
- the effect decreases during a processing as the waste advance;
- the workpiece (e.g., sheet metal) is held only on the waste towards the end phase;
- they result in reduced workpiece utilization due to pre-defined clamping zones; and,
- they result in reduced productivity since the clamping must be released at the end.

Since excitation of a workpiece takes place via the frame or the machine frame, stiff connection of the machine frame to the base is possible as an alternative solution. However, the stiff connection of heavy machines frames is technically very complex, and also imposes additional requirements on the base. The excitation of the base may in this case have a negative influence on the surrounding processes. In addition, the entire processing machine becomes more sensitive to excitations from the surroundings.

Prior DE-10335043B3 discloses a machine tool or production machine having a device for damping mechanical vibrations. In this case, piezo-actuators are used in the support elements of machine tools.

Prior US-2008/0257667A1 discloses a type of vibration decoupling between a machine tool and attachment elements that are disposed on a plate, such as a supply cable, a hydraulic component and a valve.

Prior US-2012/0217229A1 discloses a workpiece rest including a plurality of grid elements on which support elements can be placed in an arrangement required for the processing, for holding workpieces during the processing and for intercepting residual parts.

Finally, prior EP-2626165A1 discloses the lowerability of grid elements by a deflectable chain. The vibrations produced by movements of the beam tool, in particular in a direction parallel to the rest surface of the workpiece rest, are transferred unhindered to the workpiece.

SUMMARY

It is within the scope of the present disclosure to eliminate the disadvantages from the prior art, and provide beam processing machines characterized by a high processing, in particular cutting, quality, with high machine dynamics at the same time. In this case, in particular the contour accuracy of the processing should be increased, and the phenomenon of wave cut should be reduced. The processing times should be as short as possible, whereas the dynamics of the beam tool (speeds, accelerations, etc.) should be high. Solutions within the scope of the present disclosure may be simple in design and inexpensive to manufacture, and at least in one version should also be capable of retrofitting to existing installations.

This may be solved with beam processing machines mentioned initially, whereby in a vibration-transmitting connecting path between the beam tool and the rest surface for workpieces defined by a workpiece rest, at least one damping element, preferably a plurality of damping elements connected in parallel and preferably arranged at a distance from one another, is/are incorporated. A damping element may, in this case be disposed, for example, between the drive axes of the beam tool and the frame, or between frame and workpiece rest. Likewise, a damping element may be disposed in an integrated manner in the individual components, for example in the frame and/or in the workpiece rest. In any case, it is adapted for decoupling vibrations between the beam tool, or the mounting of the beam tool, or the frame, and the rest surface of the workpiece rest.

In one possible version, the damping element is incorporated in a vibration-transmitting connecting path between the beam tool and the workpiece rest. In this way, a solution may be implemented without needing to change the workpiece rest as such, so that existing workpiece rests may be used.

A vibration-transmitting connecting path is to be understood as a transmission section within beam processing machines via which mechanical vibrations caused by the dynamics of the beam tool are transmitted to the workpiece rest or its rest surface (and consequently to the workpiece to be processed). This connecting path may include parts of the frame; supporting parts; framework parts; the workpiece rest; drive axes; a bridge and/or holders; as well as the connections between individual components and to the beam tool and/or to the workpiece rest, or it can extend along these components.

The expression "connected in parallel" is to be understood not necessarily as the spatial arrangement, but rather the functional arrangement or circuit of the damping elements.

This allows a high dynamics of the beam tool without the workpiece being thereby excited in a unfavorable manner relative to the workpiece receptacle for the processing process.

In a preferred version, a damping direction of the damping imparted by the at least one damping element—preferably the main damping direction, that is, the direction having the greatest damping effect—is substantially parallel, within pertinent tolerance levels applicable in this technological field, to the rest surface of the workpiece rest. As a result, deflections of the workpiece along (that is, parallel to) the rest surface may be reliably avoided or reduced. A damping element is thereby configured in such a manner, or incorporated in the beam processing machine in such a manner, that a damping takes place in at least one direction (preferably in several directions) parallel to the rest surface. That is, the incorporated damping element is adapted to achieve a damping effect that defines or includes a damping direction that is parallel to the rest surface. The damping brought about by the at least one damping element can naturally include a plurality of direction components. Thus, the expression "a damping direction of the damping imparted by the at least one damping element" is therefore to be understood such that at least one direction component of the damping is aligned parallel to the rest surface.

In a preferred version, the damping element(s) is/are integrated in the workpiece rest itself.

In one version, the workpiece rest includes a frame, and grid elements that are mounted on the frame and which define the rest surface. The damping element or elements (for example, spring damper elements, vibration insulation plates, cylinders, etc.) may be incorporated here between the individual grid elements (for example, grid slats) and the frame, so that the damping acts between the frame of the workpiece rest and these grid elements.

Alternatively, the damping elements may form at least a part of the rest surface of the workpiece rest. In this case, the workpiece rests directly on the damping elements that, in this case, may preferably be designed as (substantially horizontally lying) damping plates (vibration isolating plates).

The versions have in common that the at least one damping element is disposed and/or adapted inside the beam processing machine in such a manner so as to achieve an at least partial decoupling of a workpiece to be processed, which is supported by the workpiece rest, from the vibrations caused by the movements of the beam tool relative to the workpiece rest.

In a nonlimiting but particularly preferred version according to the present disclosure, the connection of the workpiece rest to the frame includes at least one damping element, preferably a plurality of damping elements disposed at distances from one another. The damping element(s) is/are incorporated between the frame and the workpiece rest. The connection between workpiece rest and frame is preferably detachable, for example in order to permit displacement or withdrawal of the workpiece rest for loading with workpieces.

A vibration decoupling between workpiece rest and frame may be achieved by the damping element in particular at those frequencies that are caused by the dynamics of the beam tool and the masses co-moved with the beam tool during movement relative to the workpiece rest: such masses as for example, holders, bridges, support and the like. The present disclosure therefore follows a completely new approach, whereby it was recognized that the processing quality, in particular the contour accuracy, may also be increased even when the workpiece is not clamped during the processing. At the same time, a high dynamics of the beam tool and therefore short processing times are made possible.

It is within the scope of the present disclosure that a connection of a workpiece rest to a frame have exceptional properties for minimizing the excitations of workpieces lying on the workpiece rest.

The damping in this case preferably acts parallel to the rest surface of the workpiece rest. Particularly preferably, the damping effect of the damping element(s) is greatest in a direction parallel to the rest surface. Beam tools usually do not contact the workpiece during processing (but only the beam, e.g. laser beam or fluid jet, contacts), so that as a result of the contactless principle, there is not direct or indirect reference to the workpiece (in contrast to a circular saw or the like). Relative movements are therefore fundamentally not excluded. This is precisely an understanding within the scope of the present disclosure, to begin.

In order to minimize the effects of high tool dynamics on workpieces, a damping element may preferably include a low pass element that damps higher frequencies more strongly than low ones. A low pass element enables the dynamics of a machine to be fully utilized. In addition, a low pass element prevents any workpiece excitation via the surroundings (for example, via adjacently constructed installations). Since the beam processing machine is less strongly dependent on the surroundings, no special measures are required in the base or foundations.

The term resonance frequency will be understood hereinafter as the first (that is, in relation to the lowest-frequency) defined maximum of the resonance curve. The resonance curve is obtained, in this case, as a deflection/response in a certain spatial direction to an excitation in the same spatial direction.

A preferred version within the scope of the present disclosure is characterized in that the connection of the workpiece rest to the frame in its entirety (comprising the damping elements as well as optionally rollers via which the workpiece rest rests on the frame) is configured in such a manner that the resonance frequency of the workpiece rest in relation to the frame in at least one direction parallel to the rest surface is smaller than in the direction perpendicular to the rest surface. By this, account is taken in particular of the undesired excitation of the workpiece parallel to the rest surface.

Preferably, the resonance frequency of the workpiece rest in relation to the frame has a value of at most 10 Hz, preferably of at most 8 Hz.

In a particularly preferred version within the scope of the present disclosure, the resonance frequency of the workpiece rest in relation to the frame is at least a factor of 1.5, preferably a factor of 2, below the resonance frequency of the workpiece in relation to the workpiece rest.

In the ratio specified above, the resonance frequency of the workpiece in relation to the workpiece rest is actually employed. In contrast to this, FIG. 10 depicts the transmission of an acceleration jump, for example to the workpiece. In the 'workpiece curve' depicted there, the movement of the workpiece rest is also shown (superposition of the workpiece rest movement with the relative movement workpiece-workpiece rest). In the preferred version specified above however, "workpiece in relation to the workpiece rest" is to be understood as the relation/relative movement between workpiece and workpiece rest. This resonance frequency is therefore normalized over the input spectrum of the workpiece rest.

Also as a result of the simpler and inexpensive structure, a passive damping is preferred to an active damping. However, the latter would also be feasible, for example by means of controlled piezo-elements.

In the present disclosure, the term "framework" is to be understood as any construction that is adapted to hold the workpiece rest and carry the beam tool directly or indirectly. The beam tool may be a laser processing head or fluid processing head, each having an outlet nozzle, and may be connected directly or indirectly to the frame, for example via an additional holder, a movable bridge, a carrier or the like. The frame may therefore be a (machine) frame, a base, a pedestal, a framework and the like.

The workpiece rest defines a rest surface that is preferably substantially horizontal and is used in particular for carrying or supporting flat workpieces, in particular plates and metal sheets. The workpiece rest may, for example, be configured in the manner of a (cutting) table and/or a grid, and/or may, for example, be formed from a plurality of adjacently disposed grid or support elements or at least one mesh or at least one plate. The rest surface is in this case defined by the grid or support elements or the mesh or the plate. Thus, a rest surface therefore need not necessarily be defined by a flat surface.

The effect of versions within the scope of the present disclosure is described in detail hereinafter. The movement of the beam tool along the drive axes leads to an excitation of the frame that in turn excites the workpiece via the workpiece rest. At certain frequencies, excessive increases of the vibration amplitude of the workpiece, relative to the workpiece rest, by up to a factor of 60 are obtained in the prior art. This undesired movement parallel to the rest surface leads to a reduction in the contour accuracy that makes maximum utilization of the machine dynamics impossible.

It is within the scope of the present disclosure to now influence the transmission chain whereby the workpiece rest is damped with respect to the frame by the integration of a new type of element. As a result, the resonance frequency of the workpiece rest relative to the frame is located below the resonance frequency of the workpiece relative to the workpiece rest. As a result, the resonance frequency of the workpiece relative to the workpiece rest is less strongly excited and minimizes the perturbing movement of the workpiece relative to the frame.

The concept of damping may be applied similarly, for example, in both directions parallel to the workpiece rest surface. In this case, the effect is most effective in the direction of maximum deflection/excitation of the frame through the force of inertia at maximum acceleration (a) of the beam tool, or (b) of the masses co-moved with this tool. The modifications of the plates allow the smallest stiffness to be provided for the direction of the greatest need.

Preferably, a version within the scope of the present disclosure relates to the reduction in the resonance frequencies in spatial directions parallel to the rest surface of the tool rest. The connection of the tool rest and the frame is thus softer in these directions. Perpendicular to the rest surface, the workpiece rest usually stands on rollers on the frame. The connection in its entirety is therefore characterized in that its stiffness is/becomes lower parallel to the rest surface than perpendicular to the rest surface.

A preferred version within the scope of the present disclosure may be characterized in that the connection of the workpiece rest to the frame comprises at least one non-positive connecting device by which the workpiece rest may be fixed on the frame. In the fixed state the damping element(s) is/are arranged clamped in a clamping direction between workpiece rest and frame. The vibration decoupling may thereby be made in an elegant manner, since the clamped damping element is an integral component of the connection. The non-positive connecting device preferably includes at least one actuator, for example a pressure cylinder that is adapted to simultaneously effect the fixing of the workpiece rest and the clamping of the damping elements.

A preferred version within the scope of the present disclosure may be characterized in that the connection of the workpiece rest to the frame includes at least one, preferably detachable, clamping device by which the workpiece rest may be clamped from opposite sides. In the clamped state, the damping element(s) is/are each clamped between the workpiece rest and the clamping device. Here also, the damping element is an integral component of the connection, so that an optimal vibration decoupling may be accomplished simultaneously with reliable fixing of the workpiece rest.

A preferred version within the scope of the present disclosure may be characterized in that the clamping direction is substantially parallel to the rest surface of the workpiece rest. In the case of plates as damping elements, the clamping direction is preferably substantially perpendicular to the plane of the plate.

The non-positive connecting device, in particular clamping device, may include at least one actuator, in particular in the form of a pressure cylinder that brings about the clamping of the damping element. Here, a preferably plate-shaped damping element may be clamped between the actuator or a clamping jaw which can be moved by the actuator (e.g., in the form of a steel plate), and the workpiece rest, in order to obtain the desired damping property.

In this case, the clamping device may include at least two actuators that press uniformly from opposite sides onto the workpiece rest and thereby clamp it. However, it is also possible that only at least one actuator is provided which clamps the workpiece rest between itself and a stationary counter-stop.

The beam processing machine can also include at least two non-positive connecting devices, in particular clamping devices, that act in different regions of the workpiece rest, for example, on both end regions of the workpiece rest.

Preferably the non-positive connecting or clamping device acts on the frame of the workpiece rest during clamping or fixing via the damping elements.

A preferred version within the scope of the present disclosure may be characterized in that the damping element(s) in the clamped state have such a low stiffness in a direction parallel to the rest surface of the workpiece rest and perpendicular to the clamping direction, that workpiece rest—relative to—frame eigenfrequency of any eigenforms with direction components in the same direction is lower than the eigenfrequency of eigenforms of the workpiece relative to the workpiece rest with direction components in this direction.

Preferably, the damping element(s) in the clamped state have such a low stiffness in a direction parallel to the clamping direction that the resonance frequency of the workpiece rest relative to the frame in the direction parallel to the clamping direction is lower than the eigenfrequency of the workpiece relative to the workpiece rest in the same direction parallel to the clamping direction.

A possible version within the scope of the present disclosure may be characterized in that the damping element(s) in the clamped state in a (first) direction parallel to the rest surface of the workpiece rest and perpendicular to the clamping direction have a lower stiffness than in a (second) direction perpendicular to the rest surface. In the case of a substantially horizontally aligned rest surface, the damping elements in the (first) direction parallel to the rest surface provide for a 'softer' connection than in the vertical direction. This enables the targeted prevention of excitations or movements of the workpiece in the rest plane.

A possible version within the scope of the present disclosure may be characterized in that the damping element(s) in the clamped state in a (first) direction parallel to the rest surface of the workpiece rest and perpendicular to the clamping direction have a lower stiffness than in the clamping direction. This ensures a reliable fixing of the workpiece rest but enables a 'softer' connection in the first direction whereby a direction-dependent stronger damping can be achieved in the first direction. Thus, account can optimally be taken of the movability of the support structure (e.g., bridge) for the beam tool and its dynamics.

In summarized form, therefore, a result may be obtained wherein the damping element(s) in the clamped state in the direction parallel to the rest surface of the workpiece rest and perpendicular to the clamping direction can have a lower stiffness than in a direction orthogonal to this direction, preferably in the direction perpendicular to the rest surface or in the clamping direction.

The damping element configured as a low pass element may fundamentally be used in all directions of the workpiece plane.

However, a preferred version within the scope of the present disclosure may be characterized in that the beam tool is connected to the frame via linear drive axes; and that the damping element(s) in the installed state in a direction parallel to the drive axis having the greatest moment of inertia or parallel to the direction in which at maximum acceleration of the beam tool relative to the frame a maximum deflection or excitation of the frame takes place, have a lower stiffness than in a direction perpendicular thereto. The low pass element is therefore employed in the direction of the drive axis having the greatest moment of inertia.

A preferred version within the scope of the present disclosure may be characterized in that the beam tool is disposed on a bridge that is movable along a direction of travel; and that, in the installed state, the stiffness of the damping element(s) in a direction parallel to the direction of travel of the bridge or parallel to the direction in which at maximum acceleration of the bridge relative to the frame a maximum deflection or excitation of the frame takes place, is/are smaller than in a direction perpendicular to the direction of travel of the bridge and/or perpendicular to the direction in which at maximum acceleration of the bridge relative to the frame a maximum deflection or excitation of the frame takes place.

A preferred version within the scope of the present disclosure may be characterized in that the damping element(s) are configured to be plate-shaped and are preferably transverse, more particularly substantially perpendicular to the rest surface of the workpiece rest. This enables a particularly simple, cost-effective and space-saving solution that may additionally be retrofitted within existing installations. The damping element configured as a low pass element may be configured as a vibration insulating plate. Furthermore, the plate-shaped damping elements may be inserted in the shear direction (that is, the damping direction is parallel to the plane defined by the plate). Additionally, a plate-shaped damping may be simply mounted (for example, by the customer personally).

Plate-shaped damping elements may have a homogeneous material distribution, but may also be formed in the manner of a sandwich element from a plurality of interconnected layers.

A preferred version within the scope of the present disclosure may be characterized in that for reducing their stiffness, the damping element(s) have at least one incision and/or at least one recess; wherein preferably the at least one incision and/or the at least one recess runs transversely, preferably substantially perpendicular to the rest surface of the workpiece rest. Such arrangements enable an independent modification of stiffness (resonance frequency of the workpiece rest relative to the frame) and damping of the damping element configured as a low pass element in the shear direction. The modification may be adapted individually to a particular case of application.

A preferred version within the scope of the present disclosure may be characterized in that in the direction perpendicular to the rest surface the damping element(s) have a greater extension than in the direction parallel to the rest surface, and/or that at least two adjacently disposed damping elements are combined to form a structural unit. As a result, a direction-dependent damping may also be achieved. In directions parallel to the rest surface, for example, the connection may be 'softer' than in the direction perpendicular thereto, since it is primarily a question of minimizing excitations in the rest plane.

A preferred version within the scope of the present disclosure may be characterized in that the damping element(s) is/are formed from an elastomer material. This enables a simple implementation of the inventive idea. All possible elastomeric materials come into consideration, such as vulcanized rubber, non-vulcanized rubber and/or plastic mixtures that optionally additionally contain a vulcanized rubber granular material.

A preferred version within the scope of the present disclosure may be characterized in that the thickness of the damping element(s) in the unloaded state is at most 20 mm, preferably at most 15 mm, whereby a space-saving but efficient solution may be achieved.

A preferred version within the scope of the present disclosure may be characterized in that, on at least one of its large surfaces, at least one damping element has an electrically conducting cover, preferably in the form of a cover plate, from which an electrically conducting section emerges in order to make an electrical connection between the workpiece rest and a measuring device. This ensures an electrical transmission from workpiece rest to the frame, in particular the capacitive distance regulation of the nozzle to the workpiece surface, without influencing the stiffness or damping of the damping element configured as a low pass element with the electrical connection. No additional component is employed in this case.

A preferred version within the scope of the present disclosure may be characterized in that the damping element abuts against a plate, preferably a metal plate, in the direction towards the workpiece rest surface, said plate fastened on the frame of the workpiece rest and on its upper side having a projecting edge which covers the damping element. The damping element is thereby protected from contamination. The plate with the upper edge can, for example, be formed from a bent metal sheet.

A preferred version within the scope of the present disclosure may be characterized in that the damping element(s) include a spring, or a hydraulic damper, or a piezo-element. For example, in an oil damper or the like, damping behavior and resonance frequencies may be influenced independently of one another. Active damping elements such as low pass elements or band pass elements would also be feasible, such as, for example, piezo-actuators that are controlled by a controller. This enables a load-dependent (that is, dependent on the weight of the workpiece) adjustment or configuration, for example a drive with low corner frequency. The stiffness (resonance frequency of the workpiece rest relative to the frame) and damping may be adapted to the application.

Preferably, the damping element is a friction damping element, preferably a rubber-metal element, with the result that the effect of friction damping is also allowed.

Rubber-elastic damping elements may also be preferred.

Preferably, the damping element(s) are arranged to be removable on the beam processing machine, preferably by releasing a fastening device. The fastening device may, for example, include screw connections and/or the already-mentioned non-positive connecting device or clamping device.

It lies within the scope of the present disclosure to afford the possibility of easily exchangeable damping elements which additionally require no 'highly specialized' training. They are easy to retrofit. so that customer-specific circumstances may be taken into account by a modification of the damping elements.

The appended list of reference labels is an integral part of the disclosure. The figures are described cohesively and comprehensively. The same reference labels indicate the same components, and reference labels with different indices specify similar components or components having the same function.

BRIEF DESCRIPTION OF THE DRAWINGS

Further advantages, features and details of the invention are obtained from the following description in which non-limiting, exemplary versions within the scope of the present disclosure are described with reference to the appended drawings, where:

FIG. 1—depicts a beam processing machine;
FIG. 2—depicts a workpiece rest with damping elements;
FIG. 3—depicts a workpiece rest with clamping device;
FIG. 4a—depicts a version of a plate-shaped damping element;
FIG. 4b—depicts an embodiment with continuous notches or recesses;
FIG. 5—depicts another embodiment of a plate-shaped damping element;
FIG. 6—depicts a damping element with electrically conducting cover;
FIGS. 7-8—depict another version of damping element;
FIG. 9—is a schematic view of the vibration ratios;
FIG. 10—as a function of the frequency;
FIG. 13—depicts a variant according to the present disclosure.

DETAILED DESCRIPTION

Figure 11:
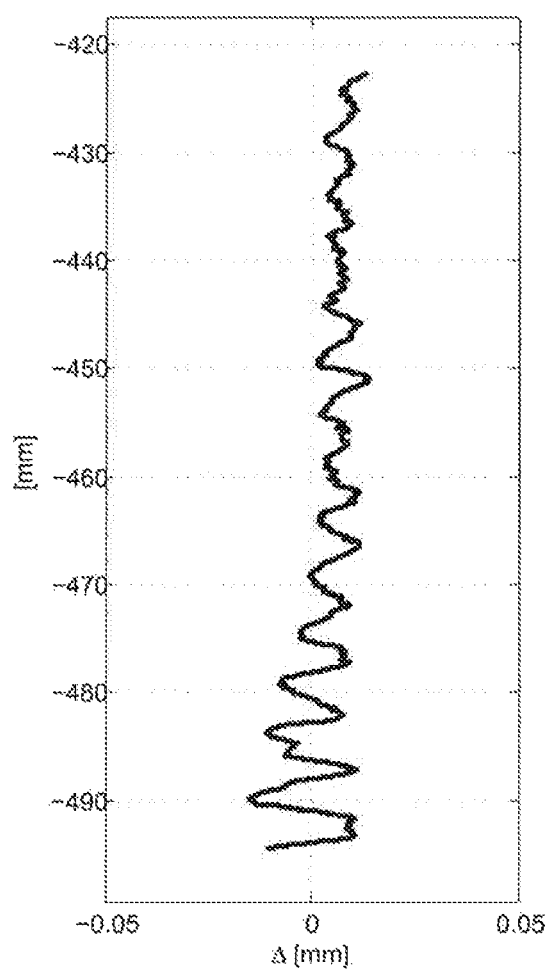
FIG. 11—depicts the measured cutting edge profile without damping elements.

Reference in this specification to "one version," "a version," "a variant," "one variant," "one embodiment," and "an embodiment," should be understood to mean that a particular feature, structure, or characteristic described in connection with the version, variant, or embodiment is included in at least one such version, variant, or embodiment of the disclosure. The appearances of phrases "in one/a version," "in one/a variant," "in one/a embodiment", and the like in various places in the specification are not necessarily all referring to the same variant, version, or embodiment, nor are separate or alternative versions, variants or embodiments necessarily mutually exclusive of other versions, variants, or embodiments. Moreover, various features are described which may be exhibited by some versions, variants, or embodiments and not by others. Similarly, various requirements are described which may be requirements for some versions, variants, or embodiments but not others. Furthermore, if the specification states a component or feature "may", "can", "could", or "might" be included or have a characteristic, it should be understood that that particular component or feature is not always necessarily required to be included or have the characteristic. Additionally, as used throughout this specification, the terms 'a', 'an', 'at least' do not denote a limitation of quantity, but rather denote the presence of at least one of the referenced item, and the term 'a plurality' denotes the presence of more than one referenced items.

FIG. 1 depicts a beam processing machine 1 for processing a workpiece 5, in particular a laser beam or fluid jet processing machine including a frame 3, a workpiece rest 4 that is held by the frame 3, and a beam tool 2 that is carried by the frame 3 and is movable relative to the workpiece rest 4.

In a preferred version, this can include a plate and/or sheet metal processing machine, where, in particular, workpieces made of metal are processed.

In the depicted version, the beam tool 2 is displaceably mounted along the drive axes Y, Z on a bridge 6. The bridge 6 in turn is displaceable along the drive axis X. Other, also redundant axes of movement are possible.

FIG. 2 depicts a workpiece rest 4 whose rest surface 15 may be formed or defined by a plurality of grid elements. The workpiece rest 4 includes a frame 14. This can rest movably via rollers 16 on the machine frame 3. The connection of the workpiece rest 4 to the frame 3 is made by at least one damping element 7—in FIGS. 2 and 3 by four damping elements 7 disposed in the corner regions of the frame.

As can be seen from FIG. 3, the connection of the workpiece rest 4 to the frame 3 includes at least one non-positive connecting device in the form of a clamping device 8. By this, the workpiece rest 4 can be fixed on the machine frame 3. In the fixed state depicted in FIG. 3, the damping elements 7 are disposed clamped between workpiece rest 4 and frame 3.

The connection is made here so that actuators 20, in particular in the exemplary form of pressure cylinders, are moved by actuation in the direction of the workpiece rest 4 and at the same time clamp the workpiece rest 4 and the damping elements 7.

The clamping device 8 is preferably detachable, that is, the clamping jaws pressing onto the damping elements 7 may be moved away from the damping elements 7. In the example of FIG. 3, the workpiece rest 4 can be clamped from opposite sides where in the clamped state the damping elements 7 are each clamped between the workpiece rest 4 and the clamping device 8 or its clamping jaws. In the version depicted in FIG. 3, the clamping device 8 arrangement includes at least two actuators 20 that clamp the workpiece rest 4 between them from opposite sides. Alternatively, it would be feasible that an actuator 20 be provided only on one side while on the opposite side a passive, preferably stationary, counterstop enables a clamping.

The clamping direction 9 is substantially parallel to the rest surface 15 of the workpiece rest 4. In the version depicted, the damping elements 7 are configured to be plate-shaped, in particular as vibration insulating plates, and are substantially perpendicular (direction 18) to the rest surface 15 of the workpiece rest 4. As can be seen from FIG. 3, the vibration insulating plates are inserted in the shear direction (direction 19). In this case, an arrangement may be selected that does not change the machine dimensions of existing installations. The damping brought about by the plate-shaped damping element 7 includes a damping direction or a damping component that is parallel to the rest surface 15 of the workpiece rest 4.

As can be seen in FIGS. 4a, 4b and 5, the damping elements 7 may have incisions 10 and/or recesses 11 transverse to the plate surface, so as to reduce their stiffness in a certain direction. In the installed state, these incisions 10 and/or recesses 11 run transversely or substantially perpendicular to the rest surface 15 of the workpiece rest 4. As a result, a direction-dependent stiffness may be achieved. Preferably in this way the shear stiffness and therefore the resonance frequency may be reduced. FIGS. 7 and 8 show a further preferred version in which the damping elements 7 have a greater extension in a direction 18 perpendicular to the rest surface 15 of the workpiece rest 4 than in the direction 19 parallel to the rest surface 15. Specifically this includes here cylindrical or rod-shaped damping elements 7. Here a plurality of (for example as here: four) damping elements 7 arranged adjacently parallel to the rest surface 15 are combined to form a structural or functional unit. That is, the damping elements 7 of the structural unit are clamped by these counterplates or counterpieces.

The damping elements 7 are preferably formed from an elastomer material. The thickness of the plate-shaped damping elements 7 in the unloaded state is preferably at most 20 mm, preferably at most 15 mm.

In possible versions, the damping elements 7 (for example, according to the type of FIG. 5) in the clamped state in a (first) direction 19 parallel to the rest surface 15 of the workpiece rest 4 and perpendicular to the clamping direction 9 each have a lower stiffness than in a (second) direction 18 perpendicular to the rest surface 15.

In further possible version, the damping elements 7 in the clamped state, in a (first) direction 19 that is parallel to the rest surface 15 of the workpiece rest 4 and perpendicular to the clamping direction 9, have a lower stiffness than in the clamping direction 9.

These options provide possibilities for direction-dependent damping, where the damping effect in at least one direction parallel to the rest surface should be large whereas a lower damping effect in other directions ensures a reliable fixing of the workpiece rest.

In connection with the version depicted in FIG. 1, the beam tool 2 is connected to the frame 3 via linear drive axes X, Y that run substantially parallel to the rest surface 15 of the workpiece rest 4. In this case, the incorporated damping elements 7 in a direction 19 parallel to the drive axis X having the largest moment of inertia (large mass of the bridge 6) have a lower stiffness than in a direction Y perpendicular to the drive axis X having the largest moment of inertia. The largest moment of inertia can in this case be seen in relation to the stiffness of the frame.

With reference to FIG. 1, this means that the beam tool 2 is arranged on a bridge 6 that is movable along a direction of travel X and that in the installed state the stiffness of the damping elements 7 in a direction 19 parallel to the direction of travel X of the bridge 6 is lower than in a direction Y perpendicular to the direction of travel X of the bridge 6.

FIG. 6 depicts a version in which a damping element 7 on at least one of its larger surfaces has an electrically conducting cover 12, preferably in the form of a cover plate, from which an electrically conducting section 13—preferably in serpentine or meander form—emerges in order to make an electrical connection between the workpiece rest 4 and a measuring device. The measuring device may be a capacitive measuring device measuring the distance between the beam outlet nozzle and the workpiece surface. The electrical connection does not adversely effect the damping effect of the damping element 7.

On the workpiece rest side, the damping element 7 can abut against a plate 17 fastened on the frame 14 of the workpiece rest 4. The plate 17 can have a projecting edge in its upper side which covers the damping element 7 and protects it from excessive contamination.

For illustration, FIG. 9 depicts the mechanical equivalent circuit diagram in the form of a spring-mass damping model of a possible beam processing machine 1 within the scope of the present disclosure. As has already been mentioned initially, at least one damping element, preferably a plurality of damping elements that are connected in parallel and that are arranged at distances from one another, are incorporated in a vibration-transmitting connecting path between the beam tool 2 and the rest surface formed by the workpiece rest 4. In the schematic diagram according to FIG. 9, for example, the arrangement of one or more damping elements may be made between beam tool 2 and bridge 6 and/or between bridge 6 and frame 3 and/or between frame 3 and workpiece rest 4. It would also be feasible that the damping element(s) were incorporated in one of the said components. The damping elements may also form the rest surface for the workpiece 5.

FIG. 10 depicts the extremely positive effects on the resonance frequency of the workpiece rest-frame system, in particular the reduction of the resonance frequency. The diagram illustrates the responses (deflection in meters, direction 19) to an acceleration jump of the bridge 6 (acceleration in m/s2 in direction 19) as a function of the frequency of frame 3, workpiece receptacle 4 and workpiece 5.

FIG. 11 depicts the contour of a cutting edge without damping elements 7 with defined wave phenomenon. It can be seen in reference to FIG. 12 how positive are the effects of measures within the scope of the present disclosure, in regard to the cutting quality.

The principle according to the present disclosure is explained in detail with reference to FIGS. 9 to 12. The wave cut caused by the workpiece excitation (FIG. 11) can be attributed to the relative movement of the workpiece 5 with respect to the frame 3. The description of the problem can be divided into three systems that transmit the excitation through the bridge 6 and/or the beam tool 2 (FIG. 9):

base-frame system (installation)
frame-workpiece rest system (connection or clamping)
workpiece rest-workpiece system (resting)

According to the present disclosure, in particular, the frame-workpiece rest system is specifically influenced.

In order that the excitation of the workpiece rest 4 onto the workpiece 5 be reduced, it was recognized that the resonance frequency of the workpiece rest 4 with respect to the frame 3 must be lower than the resonance frequency of the workpiece 5 relative to the workpiece rest 4. This can be achieved by inserting damping elements 7, in particular vibration insulating plates into the connection between frame 3 and workpiece rest 4. The damping elements 7 influence the transmission from the frame 3 to the workpiece rest 4 like a type of low-pass filter. The system may be particularly well modified by inserting soft elements that have the best possible damping effect (e.g., vibration insulating plates) in the shear direction, where the resonance frequency of the transmission function of the frame-workpiece rest system can be substantially reduced.

The measurements shown in FIG. 10 were made using commercially available vibrating insulating plates (in particular BiLoc® and AirLoc® 715 from the company AirLoc® Schrepfer AG), where these are clamped according to FIG. 3. Here, the thick lines reflect the undamped situation (according to the prior art). The thin lines illustrate that a substantial reduction in the resonance frequency of the workpiece rest-frame system could be achieved.

The resonance frequency of the frame-workpiece rest partial system according to the prior art lay relatively close to or above the resonance frequency range of the workpiece rest-workpiece system. If the connection of the workpiece rest 4 to the frame 3 becomes softer, the resonance frequency lies further away (that is, lower) and excites the system comprising workpiece rest-workpiece system less.

The aim of the connection is therefore to excite the workpiece rest 4 in the high frequency range (in the present example a critical frequency of about 12 Hz has been shown) as little as possible. This can be achieved whereby the frame-workpiece rest subsystem has the lowest possible resonance frequency.

FIG. 10 depicts the response of the frame 3 to an acceleration jump of the bridge 6 with beam tool 2, and the response of the workpiece rest 4 (a) with plate-shaped damping elements (thin curves, with a maximum at 7 Hz) and (b) without damping elements (thick curves, with a maximum at about 13 Hz). In this case, it can be seen that the workpiece rest 4 with damping elements 7 certainly moves more than without damping elements, but this movement is executed at a substantially lower frequency (around 7 Hz). At the critical frequency identified above for the example (of about 12 Hz) the workpiece rest 4 with damping elements 7 moves three times less than without damping elements.

Figure 12:
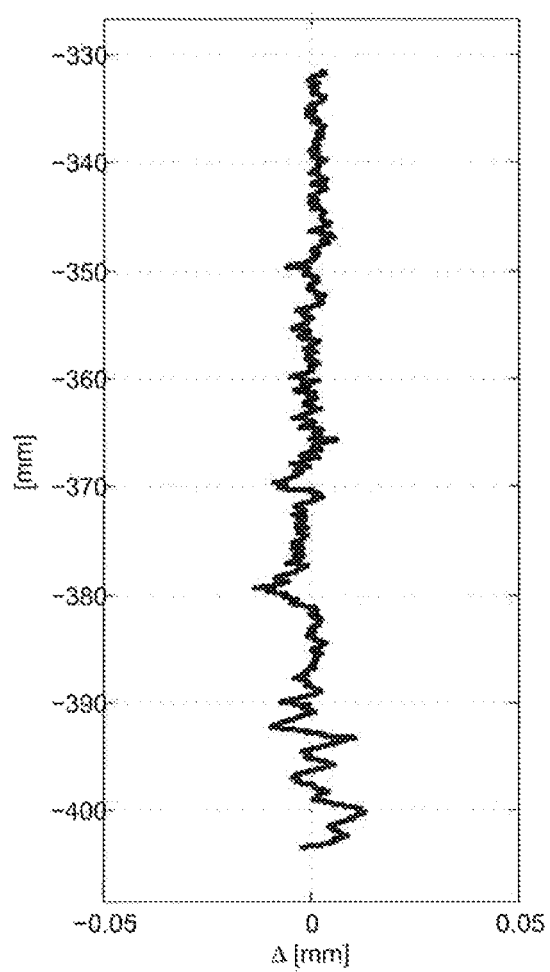
FIG. 12—depicts the measured cutting edge profile with beam processing device.

The wave phenomenon could clearly be reduced, as depicted in FIG. 12.

The scope of the present disclosure is not restricted to the embodiments shown, so that the damping elements 7 may also be configured in the form of spring-damper elements, hydraulic dampers, and/or piezo-elements.

FIG. 13 depicts another variant according to the present disclosure. The workpiece rest 4 includes a frame 14 and grid elements 21 mounted on this frame 14. These grid elements 21 are connected to the frame 14 via damping elements 7 (here: in the form of spring-damper elements). That is, here, the damping elements 7 are incorporated between the individual grid elements 21 and the frame 14 of the workpiece rest 4. In this version, the vibration decoupling is accomplished between the frame 14 and the grid elements 21.

As may be understood from FIG. 13, the damping elements 7 in the form of spring-damper elements 7 (direction 19) are therefore substantially parallel to the rest surface 15 of the workpiece rest 4. FIG. 13 depicts an example for which the damping elements 7 can be integrated in the workpiece rest 4 itself. The spring-damper elements could also be oriented inclined towards the rest surface 15. However, it is preferred if at least one direction component of the damping imparted by the damping elements 7 is parallel to the rest surface 15 (as in the version of FIG. 3), so that a vibration decoupling can be ensured in this direction 19.

It should be understood that the scope of the present disclosure is not merely restricted to the versions described and the aspects emphasized therein. On the contrary, within the inventive ideas herein presented, a plurality of modifications are possible and are hereby placed in the possession of artisans skilled in the art. It is also possible to achieve further versions by combining the described components and features without departing from the scope of claimed protection. Accordingly, the techniques and structures described and illustrated herein should be understood to be illustrative and exemplary, and not limiting upon the scope of present invention.

In closing, it should be noted that the above description is intended to illustrate rather than limit the invention, and that readers skilled in the technological art shall be capable of designing many alternative embodiments without departing from the protected scope of invention as set forth by the appended claims. As equivalent elements can be substituted for elements employed in claimed invention so as to obtain substantially the same results in substantially the same way, the protected scope of the present invention is defined by the appended claims, including known equivalents and unforeseeable equivalents at the time of filing of this application. Furthermore, in the claims, the verb 'comprise' and its conjugations do not exclude the presence of elements or steps other than those listed in any claim or the specification as a whole. The singular reference of an element does not necessarily exclude the plural reference of such elements and vice-versa. The mere fact that certain measures are recited in mutually different dependent claims does not necessarily indicate that a combination of these measures cannot be used to advantage.

LIST OF REFERENCE LABELS

1 Beam processing machine
2 Beam tool
3 Frame (machine)
4 Workpiece rest
5 Workpiece
6 Bridge
7 Damping element
8 Clamping device
9 Clamping direction
10 Incision
11 Recess
12 Cover
13 Electrically conducting section
14 Frame (workpiece rest)
15 Rest surface
16 Rollers
17 Metal plate
18 Direction perpendicular to rest surface 15
19 Direction parallel to rest surface 15
20 Actuator
21 Grid element
X,Y,Z linear drive axes

The invention claimed is:
1. A beam processing machine for processing a workpiece, comprising:
a frame;
a workpiece rest held by the frame, including a rest surface configured to hold a workpiece;

a tool configured to emit a laser beam or a fluid jet, carried by the frame and movable relative to the workpiece rest;

within the beam processing machine a vibration-transmitting connecting path between the tool and the rest surface, transmitting mechanical vibrations caused by the dynamics of the tool to the rest surface of the workpiece rest;

at least one damping element incorporated into said vibration-transmitting connecting path or a plurality of damping elements connected in parallel and arranged at a distance from one another, is incorporated;

wherein the at least one damping element or plurality of damping elements is located between the workpiece rest and the frame; and wherein the at least one damping element or plurality of damping elements is one of a spring damper, a damper including elastomeric material, a hydraulic damper, a piezo-element damper, or a friction damping element.

2. The beam processing machine according to claim 1, wherein a main damping direction of the damping imparted by the at least one damping element is substantially parallel to the rest surface of the workpiece rest.

3. The beam processing machine according to claim 1, wherein the damping element(s) is/are integrated in the workpiece rest, wherein the workpiece rest comprises a frame and grid elements mounted on the frame, wherein the grid elements are connected to the frame via the damping element(s).

4. The beam processing machine according to claim 1, further comprising a connection between the frame and the workpiece rest, and wherein the damping element(s) is/are part of the connection.

5. The beam processing machine according to claim 4, wherein the connection comprises at least one non-positive connecting device configured to place workpiece rest into a fixed state on the frame, and wherein in the fixed state the damping element(s) is/are clamped in a clamping direction between the workpiece rest and the frame.

6. The beam processing machine according to claim 5, wherein the clamping direction is substantially parallel to the rest surface of the workpiece rest.

7. The beam processing machine according to claim 4, wherein the connection comprises at least one clamping device configured to clamp the workpiece rest from opposite sides, and wherein in the clamped state the damping element(s) is/are clamped between the workpiece rest and the at least one clamping device.

8. The beam processing machine according to claim 1, further comprising a connection between the frame and the workpiece rest, wherein the connection is configured so that the resonance frequency of the workpiece rest relative to the frame in at least one direction parallel to the rest surface is lower than a resonance frequency of the workpiece rest relative to the frame in a direction perpendicular to the rest surface.

9. The beam processing machine according to claim 1, wherein the tool is connected to the frame via linear drive axes that are substantially parallel to the rest surface and wherein the damping element(s) have a lower stiffness in a direction parallel to the direction in which at maximum acceleration of the tool relative to the frame a maximum deflection or excitation of the frame takes place than their stiffness of the damping element(s) in a direction in which at maximum acceleration of the tool relative to the frame a maximum deflection or excitation of the frame takes place.

10. The beam processing machine according to claim 1, wherein the tool is disposed on a bridge which is movable along a direction of travel and wherein the damping element(s) has a stiffness in a direction parallel to a direction in which at maximum acceleration of the bridge relative to the frame a maximum deflection or excitation of the frame takes place, that is/are smaller than a stiffness in a direction perpendicular to the direction in which at maximum acceleration of the bridge relative to the frame a maximum deflection or excitation of the frame takes place.

11. The beam processing machine according to claim 1, wherein the damping element(s) is/are plate-shaped and is/are oriented transversely to the rest surface of the workpiece rest.

12. The beam processing machine according to claim 1, the damping element(s) include/s at least one incision and/or at least one recess, and wherein the at least one incision and/or the at least one recess is oriented transversely to the rest surface of the workpiece rest.

13. The beam processing machine according to claim 1, wherein the damping element(s) is/are configured to have a greater extension in a direction perpendicular to the rest surface than in a direction parallel to the rest surface.

14. The beam processing machine according to claim 1, wherein the damping element(s) has/have a thickness in an unloaded state that is at most 20 mm.

15. The beam processing machine according to claim 1, wherein the damping element(s) includes an electrically conductive cover plate that, in turn, includes an electrically conductive section configured to make an electrical connection between the workpiece rest and a measuring device.

16. The beam processing machine according to claim 1, wherein the at least one damping element abuts against a plate fastened to the frame, wherein the plate has a projecting edge which covers the at least one damping element.

17. The beam processing machine according to claim 1, wherein the damping element(s) are configured to be removable.

18. The beam processing machine according to claim 1, wherein said at least one damping element is configured so that a resonance frequency of the workpiece rest in relation to the frame in at least one direction parallel to the rest surface has a value of at most 10 Hz.

19. The beam processing machine according to claim 1, wherein the tool is disposed on a bridge that is movable along a direction of travel and wherein said at least one damping element has a stiffness in a direction parallel to said direction of travel that is smaller than a stiffness in a direction that is perpendicular to said direction of travel.

20. The beam processing machine according to claim 1, wherein the damping element is/are incorporated into a frame of the workpiece rest and oriented toward the frame of the beam processing machine or the damper is incorporated into the frame of the beam processing machine and oriented towards the workpiece rest.

21. A beam processing machine for processing a workpiece, comprising:
  a frame;
  a workpiece rest held by the frame, including a rest surface configured to hold a workpiece;
  a tool configured to emit a laser beam or a fluid jet, carried by the frame and movable relative to the workpiece rest;
  within the beam processing machine wherein a vibration-transmitting connecting path between the tool and the rest surface, transmitting mechanical vibrations caused by the dynamics of the tool to the rest surface of the workpiece rest;

at least one damping element incorporated into said vibration-transmitting connecting path a plurality of damping elements connected in parallel and arranged at a distance from one another, is/are incorporated; and wherein the at least one damping element or plurality of damping elements is located between the workpiece rest and the frame.

22. The beam processing machine according to claim 21, wherein the at least one damping element or plurality of damping elements is a spring damper.

23. The beam processing machine according to claim 22, further comprising a connection between the frame and the workpiece rest, and wherein the damping element(s) is/are part of the connection.

24. The beam processing machine according to claim 22, wherein the damping element(s) is/are incorporated into a frame of the workpiece rest and oriented toward the frame of the beam processing machine or the damper is incorporated into the frame of the beam processing machine and oriented towards the workpiece rest.

25. The beam processing machine according to claim 21, wherein the at least one damping element or plurality of damping elements is a damper including elastomeric material.

26. The beam processing machine according to claim 25, further comprising a connection between the frame and the workpiece rest, and wherein the damping element(s) is/are part of the connection.

27. The beam processing machine according to claim 25, wherein the damping element(s) is/are incorporated into a frame of the workpiece rest and oriented toward the frame of the beam processing machine or the damper is incorporated into the frame of the beam processing machine and oriented towards the workpiece rest.

28. The beam processing machine according to claim 21, wherein the at least one damping element or plurality of damping elements is a hydraulic damper.

29. The beam processing machine according to claim 28, further comprising a connection between the frame and the workpiece rest, and wherein the damping element(s) is/are part of the connection.

30. The beam processing machine according to claim 28, wherein the damping element(s) is/are incorporated into a frame of the workpiece rest and oriented toward the frame of the beam processing machine or the damper is incorporated into the frame of the beam processing machine and oriented towards the workpiece rest.

31. The beam processing machine according to claim 21, wherein the at least one damping element or plurality of damping elements is a piezo-element damper.

32. The beam processing machine according to claim 28, further comprising a connection between the frame and the workpiece rest, and wherein the damping element(s) is/are part of the connection.

33. The beam processing machine according to claim 28, wherein the damping element(s) is/are incorporated into a frame of the workpiece rest and oriented toward the frame of the beam processing machine or the damper is incorporated into the frame of the beam processing machine and oriented towards the workpiece rest.

34. The beam processing machine according to claim 21, wherein the at least one damping element or plurality of damping elements is a friction damping element.

35. The beam processing machine according to claim 34, further comprising a connection between the frame and the workpiece rest, and wherein the damping element(s) is/are part of the connection.

36. The beam processing machine according to claim 34, wherein the damping element(s) is/are incorporated into a frame of the workpiece rest and oriented toward the frame of the beam processing machine or the damper is incorporated into the frame of the beam processing machine and oriented towards the workpiece rest.

* * * * *